United States Patent [19]

Sharpe

[11] Patent Number: 5,078,347

[45] Date of Patent: Jan. 7, 1992

[54] ENERGIZED CONDUCTOR SUPPORTS

[76] Inventor: Robert F. Sharpe, 2141 Fort Rice St., Petersburg, Va. 23805

[21] Appl. No.: 657,375

[22] Filed: Feb. 19, 1991

Related U.S. Application Data

[63] Continuation of Ser. No. 433,902, Nov. 9, 1989, abandoned.

[51] Int. Cl.⁵ ............................................. F16L 3/00
[52] U.S. Cl. ............................................. 248/59
[58] Field of Search .................. 248/58, 59, 62, 63, 248/327, 68.1, 70; 211/125, 113; 174/146

[56] References Cited

U.S. PATENT DOCUMENTS

| | | | |
|---|---|---|---|
| 316,922 | 4/1885 | Trask | 248/62 |
| 569,755 | 10/1896 | Grist | 248/58 |
| 799,092 | 9/1905 | Rosenfeld | 248/68.1 |
| 2,285,632 | 6/1942 | Urbain | 248/70 |
| 2,934,594 | 4/1960 | Flower | 174/146 |
| 2,972,460 | 2/1961 | Kenyon | 248/68.1 |
| 3,155,354 | 11/1964 | Lindsey | 248/63 |
| 4,709,888 | 12/1987 | Cubit | 248/68.1 |

Primary Examiner—Ramon O. Ramirez
Assistant Examiner—Robert A. Olson
Attorney, Agent, or Firm—Cushman, Darby & Cushman

[57] ABSTRACT

Apparatus for supporting energized conductors while repair work is being done on insulators or to a utility pole whereby work can be performed expediently without interrupting the power being supplied to consumers. The invention includes a longitudinal beam with conductor supports mounted thereto. The present invention is designed to be supported from above and to dangle downwards while supporting the conductors. It is also advisable to provide the invention with a lower attachment to steady the beam. The apparatus is adaptable to any phase spacing of vertical conductors. The apparatus can also hold horizontal bundled conductors with some modifications to the support brackets.

16 Claims, 3 Drawing Sheets

ENERGIZED CONDUCTOR SUPPORTS

This is a continuation of application Ser. No. 07/433,902, filed on Nov. 9, 1989, which was abandoned upon the filing hereof.

BACKGROUND OF THE INVENTION

1. Field of the Invention

This invention relates to an apparatus for supporting energized conductors that run parallel to each other such as on telephone or power poles. More particularly, this invention relates to supporting brackets mounted on a fiberglass beam with the apparatus for supporting energized conductors being suspended from above or below allowing.

2. Description of the Prior Art

With the increasing demand for energy in our society, the number of power lines has markedly increased with increased use of poles and other associated equipment. Poles are often targets of abuse and their increased number requires more frequent replacement or simply due to use or decay, they often have to be replaced.

To date, insulator or pole replacement work required power in the conductors to be off so as not to endanger the utility workers. Alternatively, this type of work was done with devices called "hot sticks" which are insulated rods that are constructed so as to effectively, but cumbersomely, manipulate live power lines. These hot sticks are long rods, usually operated from the ground.

SUMMARY OF THE INVENTION

In order to overcome the difficulties imposed by earlier approaches, the present invention provides apparatus capable of temporarily supporting energized conductors while work is being done about them. Davit arms which support energized conductors can be easily replaced on lines using the present invention and damaged insulators can be replaced more efficiently. The present invention is especially effective in allowing live power lines to be manipulated to permit this pole replacement task when all three horizontal post type insulators are on the same side of the pole. This invention greatly reduces inconvenience to the consumer in that the power can remain on while work with live conductors is being done and allows the repairs to be done more easily than before. This invention also allows energized conductors to be adequately supported while work is being done instead of putting them under unnecessary stress. This invention is adaptable to any phase spacing as the brackets are movable. Also, this invention is adaptable for bundled conductors where at some points conductors run on both sides of the fiberglass beam at the same height.

The apparatus includes a beam member used in a vertical position having a top end, a bottom end, and a longitudinal axis, means for supporting the energized conductors provided on said beam member and means for varying the spacing between the means for supporting the energized conductors along the beam's longitudinal axis. The apparatus can be adapted to accept different phase spacings of conductors, making it versatile in that the apparatus can accommodate any spacing of vertical energized conductors. The apparatus is preferably suspended from above by means such as a crane while in use. However, it is merely desirable to have the invention supported so as to be movable in order to appropriately manipulate the lines relative to the work to be undertaken. It is also desirable to further secure the invention from below as well so as to prevent unwanted movement such as motion that is caused by wind.

The apparatus of the present invention can also be adaptable to effectively support bundled conductors, multiple conductors appearing at the same height, with only slight modifications to the brackets are mounted on the beam.

Other objects, features, and characteristics of the present invention, as well as the methods of operation and functions of the related elements of the structure, and the combination of parts and economics of manufacture, will become apparent upon consideration of the following description and the appended claims with reference to the accompanying drawings, all of which form a part of this specification, wherein like reference numerals designate like parts in the various figures.

DETAILED DESCRIPTION OF THE PRESENTLY PREFERRED EXEMPLARY EMBODIMENT

Figure 1:
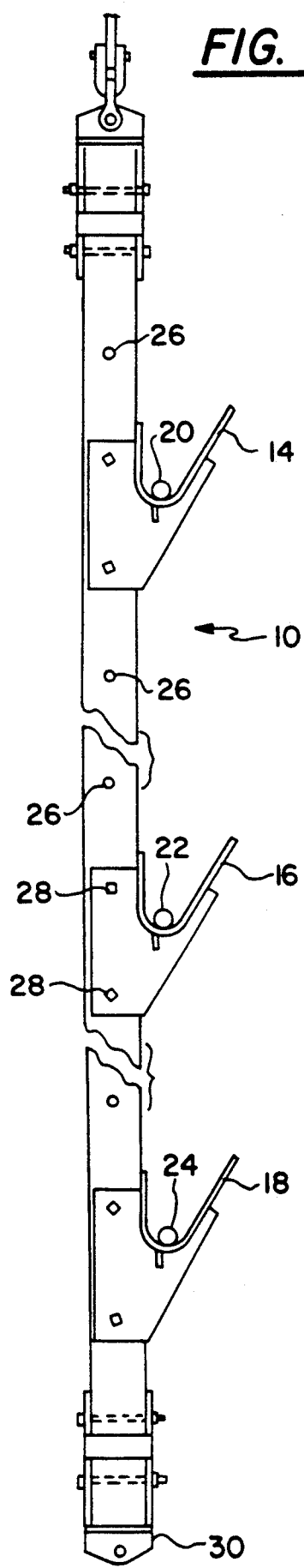
FIG. 1 is a side elevational view of the present invention perpendicular taken in a direction parallel to the conductors being lifted.

The apparatus according to the present invention is shown generally at 10 in FIG. 1 and is comprised of a main support pole 12, comprised of a non-conductive material such as, for example, fiberglass. However, any non-conductive material can be employed. Further, while the pole 12 pictured had a rectangular cross section, it is possible that the pole could have a circular cross section but it would then be more difficult to fabricate brackets for round beams. The apparatus also includes a plurality of spaced apart support brackets as indicated at 14, 16, and 18. The spacing between support brackets 14, 16, and 18 is not fixed and can be altered so as to be comparable to the vertical spacing between conductors such as at 20, 22, and 24. Pole 12 is provided with a plurality of through holes 26 with each being spaced about nine inches apart. Each bracket is removably secured in place by a pair of bolts 28 thereby permitting the brackets, to be properly positioned to suit a particular conductor configuration.

The present invention provides a means by which conductor support brackets 14, 16, and 18 can be mounted on a non-conductive pole or beam 12 and have each conductor support attached so that energized conductors can rest in the conductor supports.

Figure 2:
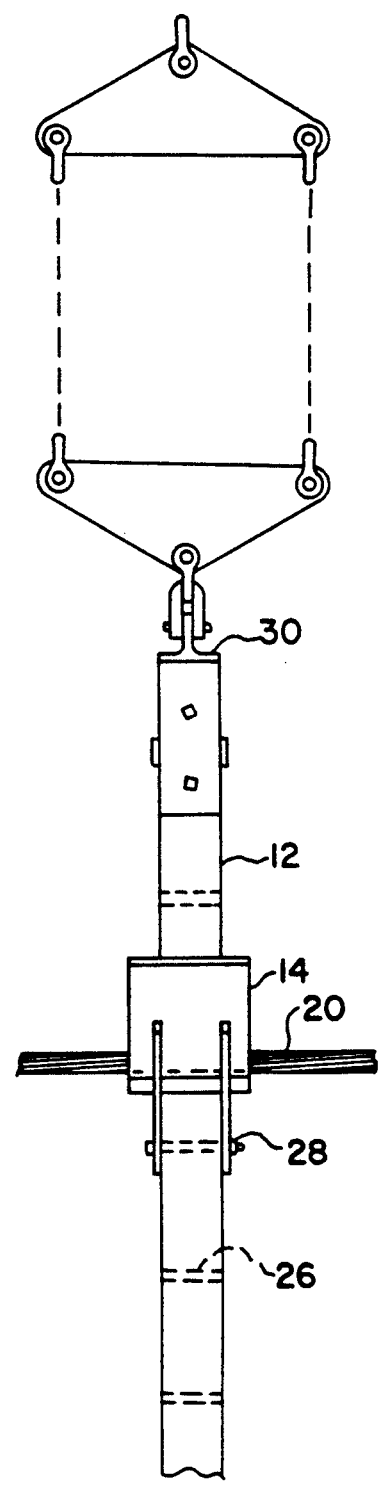
FIG. 2 is a front elevational view of the upper portion of the apparatus shown in FIG. 1.

As shown in FIG. 2, it is desirable to support the fiberglass beam 12 from above by means such as an attachment member or vang 30 which is capable of holding about an 18,000 pound ultimate load or about a 6,000 pound working load. It is possible that the beam 12 can be supported from below. The attachment vang 30 can be supported by a crane via a harness 31 comprising polymer insulators attached to means for supporting the beam 12 and means for being supported from above. There can also be an attachment vang 30 located at the bottom of the fiberglass beam 12 for steadying the equipment. Other possible means to support the equipment involve using means such as insulated lines or hot sticks.

The fiberglass beam 12 is made up of sections which can be assembled so as to accommodate any spacing of the conductors. Assembling the beam 12 from pieces also enables the easy transport of the beam from place to place.

Figure 3:
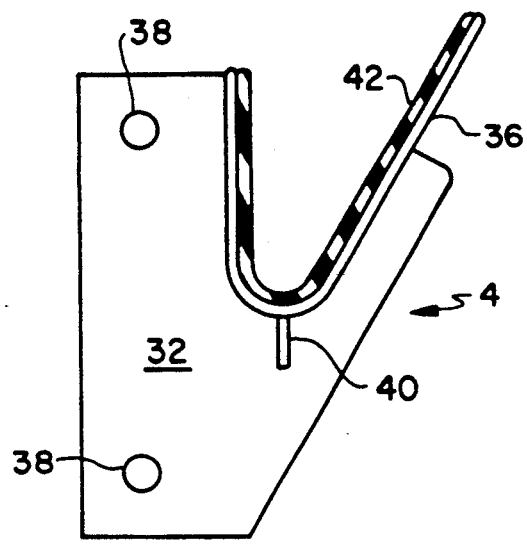
FIG. 3 is a front elevational view of one of the conductor supports.
Figure 4:
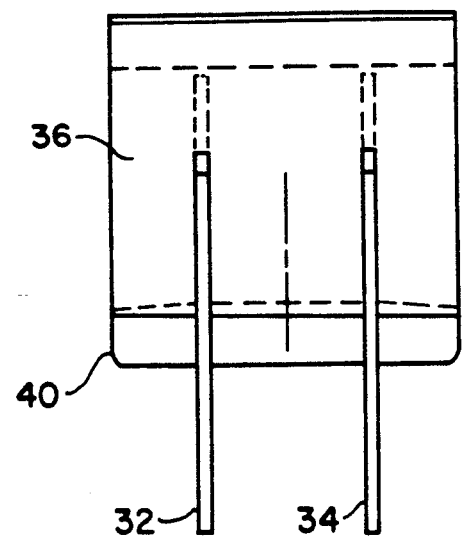
FIG. 4 is a front view taken in the direction of arrow 4 in FIG. 3.

With reference to FIGS. 3 and 4, brackets 14, 16, and 18 are identical and only bracket 14 will be specifically described. Bracket 14 is comprised of a pair of support plates 32, 34 that are welded or otherwise fixed to an upwardly opening, generally U-shaped member 36. Each support plate 32, 34 includes an opening shaped to receive member 36 therein. Each support plate also includes a pair of holes 38 through which bolts 26 pass to connect the bracket to beam 12. If desired, an additional brace, such as steel insert 40 can be used to further affix member 36 to the bracket 14. Any holes in the fiberglass beam 12 that are not being used for a bracket will preferably have a bolt through them capped with rubber or neoprene.

The bracket 14 is made of steel having a neoprene lining 42 that protects the aluminum wire from being damaged while laying in the steel bracket during the support operation. Any soft material would suffice in place of the neoprene. The conductor support is curved so as to allow an energized conductor to rest at the base of the curve. The conductor support 36 extends vertically along the fiberglass beam 12 and then curves 150° and extends beyond the end of the bracket 14. The interior of support 36 has a neoprene coating 42 upon which conductors rest. If an electrical charge should somehow access the bracket 14, it cannot travel in the beam 12 since the beam 12 is constructed of an insulating material.

Figure 5:
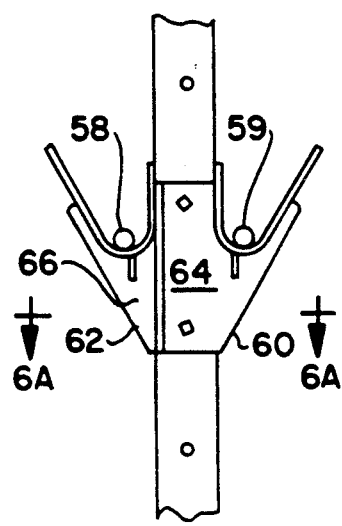
FIG. 5 is a side elevational view of a modified conductor support arrangement for use with a pair of side-by-side conductors.
Figure 6A:
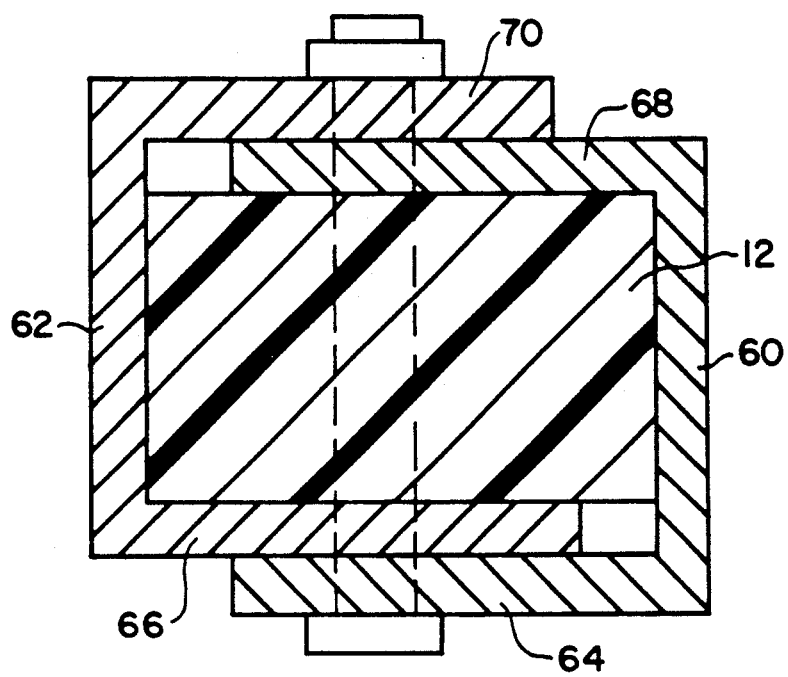
FIG. 6A is a cross-sectional view taken along line 6A—6A depicting an arrangement for the support brackets when attached to a beam at the same height.
Figure 6B:
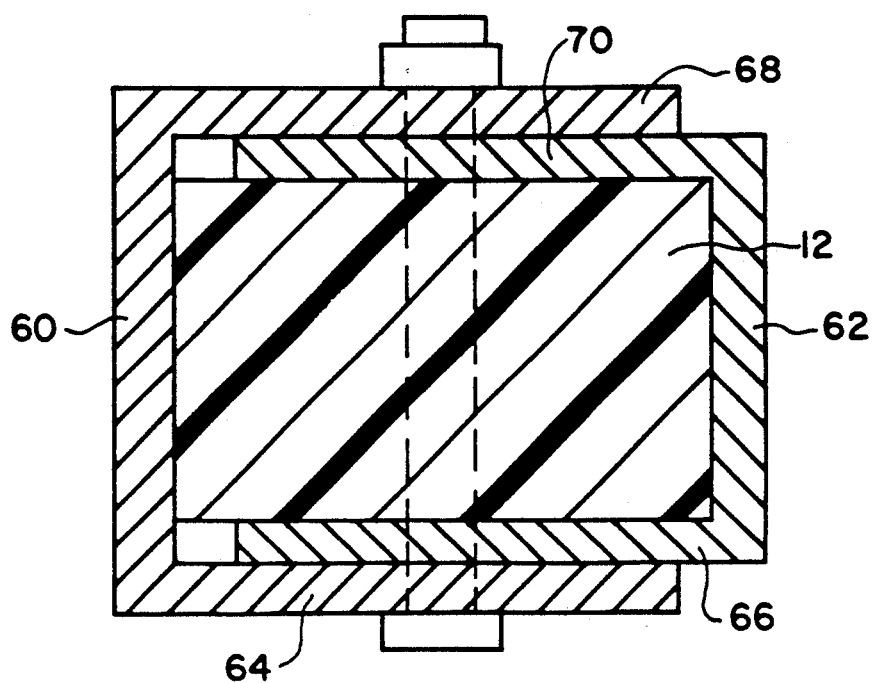
FIG. 6B is an alternative support bracket mounting arrangement.

As shown in FIGS. 5 and 6, the apparatus is shown supporting two energized conductors 58, 59. In this situation, there are two preferable configurations of mounting the supports to the beam 12. The two possibilities are shown in FIGS. 6A and 6B. FIG. 6B depicts a first support made of side walls 70, 66 and front wall 62 secured to the beam 12 while the second support constructed of side walls 68, 64, and front wall 60 is secured around the outside of the first support. The supports are bolted to beam 12.

FIG. 6A depicts an arrangement for the two supports where the side walls overlap in an alternating fashion. The two supports are mounted, as above, by a bolt to beam 12.

While the present invention has been described in connection with what is presently considered to be the preferred embodiment, it is to be understood that the invention is not limited to the disclosed embodiment, but, on the contrary, is intended to cover various modifications and arrangements included within the spirit and scope of the claims. For example, the conductor support brackets may be fabricated so as to enclose the conductor or may be made out of a totally different material.

What is claimed is:

1. In combination, an apparatus for temporarily manipulating an energized power transmission line conductor supported on a power line transmission structure, comprising:
   an elongated insulated beam member having a top end, a bottom end, and a longitudinal axis;
   means defining a plurality of mounting positions spaced along said beam;
   at least one support bracket removably mounted at one of said plurality of mounting positions on said elongated beam member, each such support bracket having an upwardly opening conductor receiving portion; and;
   means for operatively supporting and raising and lowering said beam member in order to position said at least one support bracket adjacent a power transmission line conductor to engage and move the conductor within the support bracket so that the conductor can be supported away from a power line transmission structure or positioned to be connected to such a power line transmission structure.

2. Apparatus as claimed in claim 1, further comprising a plurality of support brackets each of which is mounted in one of said plurality of mounting positions.

3. Apparatus as claimed in claim 1, further comprising conductor supports, said conductor supports being secured to said support brackets and having a parabolic inner and outer surface, the inner surface being formed so that the energized conductors rest therein.

4. Apparatus as claimed in claim 3, wherein said conductor supports include linings made of a soft material fixed to said inner surface.

5. Apparatus as claimed in claim 4, wherein said soft material is neoprene.

6. Apparatus as claimed in claim 1, wherein said means for operatively supporting the beam comprises:
   first beam supporting means attached to the top end of said beam for supporting said beam from above by a device such as a crane;
   insulating means attached to said first beam supporting means for further isolating the apparatus from the energized conductors; and
   second beam supporting means attached to the bottom of said beam for steadying the apparatus from below.

7. Apparatus as claimed in claim 6, wherein said first beam supporting includes an attachment vang.

8. Apparatus as claimed in claim 6, wherein said insulating means includes polymer insulators.

9. Apparatus as claimed in claim 6, wherein said second beam supporting means includes an attachment vang.

10. Apparatus for temporarily manipulating energized power transmission line conductors supported by power line poles to allow replacement and repair of power line equipment while the power transmission line conductors remain energized, comprising:
    an insulated beam member having a top end and a bottom end;
    means defining a plurality of mounting positions spaced along said beam member;
    first and second support brackets each having an upward opening conductor receiving portion, said brackets being removably mounted on said beam member at the same longitudinal mounting position so that they can support conductors located at the same longitudinal position along said beam, said upwardly opening conductor receiving portion temporarily receiving, supporting and releasing said conductor; and means for operatively supporting said beam member, said supporting means being able to raise and lower said beam so as to position said support brackets at positions adjacent said conductors so that the conductors can be engaged by said support brackets and to move said conductors positioned within said support brackets.

11. Apparatus as claimed in claim 10, wherein the first support bracket is mounted directly to said beam and said second support bracket fits over the mount for said first support bracket.

12. Apparatus as claimed in claim 10, wherein said first and second support brackets interlock with each other about said beam, said beam having a first and second side, each of said brackets being mounted directly to said beam on one side and mounted outside the other support bracket on the other side.

13. Apparatus for temporarily supporting at least one energized power transmission line conductor to allow replacement and repair of power line equipment as the conductor remains energized, comprising:

a beam member made from an insulating material, said beam member having an upper portion and a bottom portion;

means defining a plurality of mounting positions spaced along said beam member;

at least one support bracket removably mounted on said beam member at one of said plurality of mounting positions, each bracket having an upwardly opening conductor receiving portion to temporarily receive, support and release said at least one conductor; and means for operatively supporting said beam member from the top portion thereof, said supporting means being capable of holding up to about 18,000 pound loads and being able to raise and lower said beam member so as to position said at least one support bracket adjacent said at least one conductor and to move said conductor when received therein.

14. Apparatus as claimed in claim 13, wherein first and second support brackets mounted on said beam at a same longitudinal position serve to support conductors located at the same longitudinal position.

15. Apparatus as in claim 13 wherein a plurality of support brackets are provided to receive a plurality of energized conductors, and wherein said plurality of mounting positions provides means for varying the spacing between said plurality of support brackets so that the support brackets can be positioned along said beam member to accommodate a variety of different phase spacings associated with the conductors.

16. Apparatus as in claim 13 wherein said at least one support bracket further includes a beam mounting portion for fixing about at least a portion of said beam member and a layer of soft protective material positioned within said upwardly opening conductor receiving portion.

* * * * *